United States Patent
Schwald

(10) Patent No.: US 6,676,161 B2
(45) Date of Patent: Jan. 13, 2004

(54) LINEAR PRETENSIONING DRIVE FOR A SEAT BELT

(75) Inventor: Stefan Schwald, Hersching (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 50 days.

(21) Appl. No.: 10/135,568

(22) Filed: May 1, 2002

(65) Prior Publication Data
US 2003/0011186 A1 Jan. 16, 2003

(30) Foreign Application Priority Data
Jul. 12, 2001 (DE) .................... 201 11 638 U

(51) Int. Cl.[7] ............................................. B60R 22/35
(52) U.S. Cl. .................. 280/806; 280/801.1; 297/480; 296/214; 188/371; 188/374
(58) Field of Search ........................... 280/806, 801.1; 207/480; 296/214; 188/371, 374

(56) References Cited

U.S. PATENT DOCUMENTS

| | | | | |
|---|---|---|---|---|
| 4,023,427 A | * | 5/1977 | Beier | 297/480 |
| 4,054,032 A | * | 10/1977 | Patrichi | 60/632 |
| 4,840,325 A | * | 6/1989 | Higuchi et al. | 242/374 |
| 4,860,698 A | * | 8/1989 | Patrichi et al. | 123/24 R |
| 4,913,497 A | * | 4/1990 | Knabel et al. | 297/480 |
| 4,925,123 A | * | 5/1990 | Frei et al. | 242/374 |
| 5,519,997 A | * | 5/1996 | Specht | 60/632 |
| 5,634,690 A | * | 6/1997 | Watanabe et al. | 297/480 |
| 5,685,567 A | * | 11/1997 | Koujiya et al. | 280/806 |
| 5,887,897 A | * | 3/1999 | Gill et al. | 280/806 |
| 5,897,140 A | * | 4/1999 | Wier | 280/806 |
| 6,076,856 A | * | 6/2000 | Wang et al. | 280/806 |
| 6,094,913 A | * | 8/2000 | Wier | 60/636 |
| 6,186,549 B1 | * | 2/2001 | Specht et al. | 280/806 |
| 6,250,683 B1 | * | 6/2001 | Betz | 280/806 |
| 6,325,416 B1 | * | 12/2001 | Wier | 280/806 |
| 6,443,380 B1 | * | 9/2002 | Biller et al. | 242/374 |
| 6,595,694 B2 | * | 7/2003 | Schwald | 384/476 |

FOREIGN PATENT DOCUMENTS

| | | | |
|---|---|---|---|
| DE | 20300429 U | * | 1/2003 |
| EP | 1060958 | | 12/2000 |
| WO | WO 02/08029 A1 | * | 5/2001 |

* cited by examiner

*Primary Examiner*—Michael J. Carone
*Assistant Examiner*—John Richardson
(74) *Attorney, Agent, or Firm*—Lonnie Drayer; Jarett Rieger

(57) ABSTRACT

A linear pretensioning drive for tightening a vehicle seat belt has a guide tube. A piston is located inside of the guide tube and can be driven along a longitudinal axis of the guide tube. A reverse movement lock is formed by balls that are arranged on a ring around the longitudinal axis of the guide tube. In the drive direction in front of the reverse movement lock at least one support part is provided which lies against the inner wall of the guide tube in the locking position with in each case a greater supporting surface than each ball of the reverse movement lock.

7 Claims, 2 Drawing Sheets

LINEAR PRETENSIONING DRIVE FOR A SEAT BELT

FIELD OF THE INVENTION

The present invention relates to a linear pretensioning drive for tightening a vehicle seat belt.

DISCUSSION OF THE PRIOR ART

A pretensioning drive taught in taught in EP 1 060 958 A1 has a guide tube with a drivable piston, which is connected to a seat belt via a pulling means, for instance a traction cable. The traction cable is connected to a belt buckle of the seat belt. When driven, for instance with the help of a pyrotechnic driving means, the piston is guided along the guide tube. To avoid a return stroke of the piston in the opposite direction to the drive direction after the pretensioning of the seat belt, a reverse movement lock is provided on the piston in the form of a ball ring. The reverse movement lock is in this case moved into a locking position, by which the return stroke of the piston in the opposite direction to the drive direction is avoided. If the reverse movement lock is formed by a ball ring, the balls of which are arranged around the longitudinal axis of the guide tube, the individual balls lie against merely a small supporting surface of the inner wall of the guide tube in the locking position. Due to these small surface contact points lying on a circle, an excessive load can be exerted on the guide tube. This load can also occur when clamping bodies are used with line-shaped or small supporting surfaces.

SUMMARY OF THE INVENTION

There is provided in accordance with the present invention a linear pretensioning drive for tightening a vehicle seat belt comprising: a guide tube; a piston that is located inside the guide tube and can be driven along a longitudinal axis of the guide tube in a drive direction; and a reverse movement lock comprising locking elements arranged on a ring around the longitudinal axis of the guide tube, the locking elements, on movement of the piston in an opposite direction to the drive direction, assume a locking position between the piston and the guide tube, which locks the further return stroke of the piston against the drive direction, in the drive direction in front of the reverse movement lock at least one support part is provided which, in the locking position, lies against an inner wall of the guide tube with a greater supporting surface than each locking element of the reverse movement lock.

DETAILED DESCRIPTION OF THE INVENTION

Figure 1:
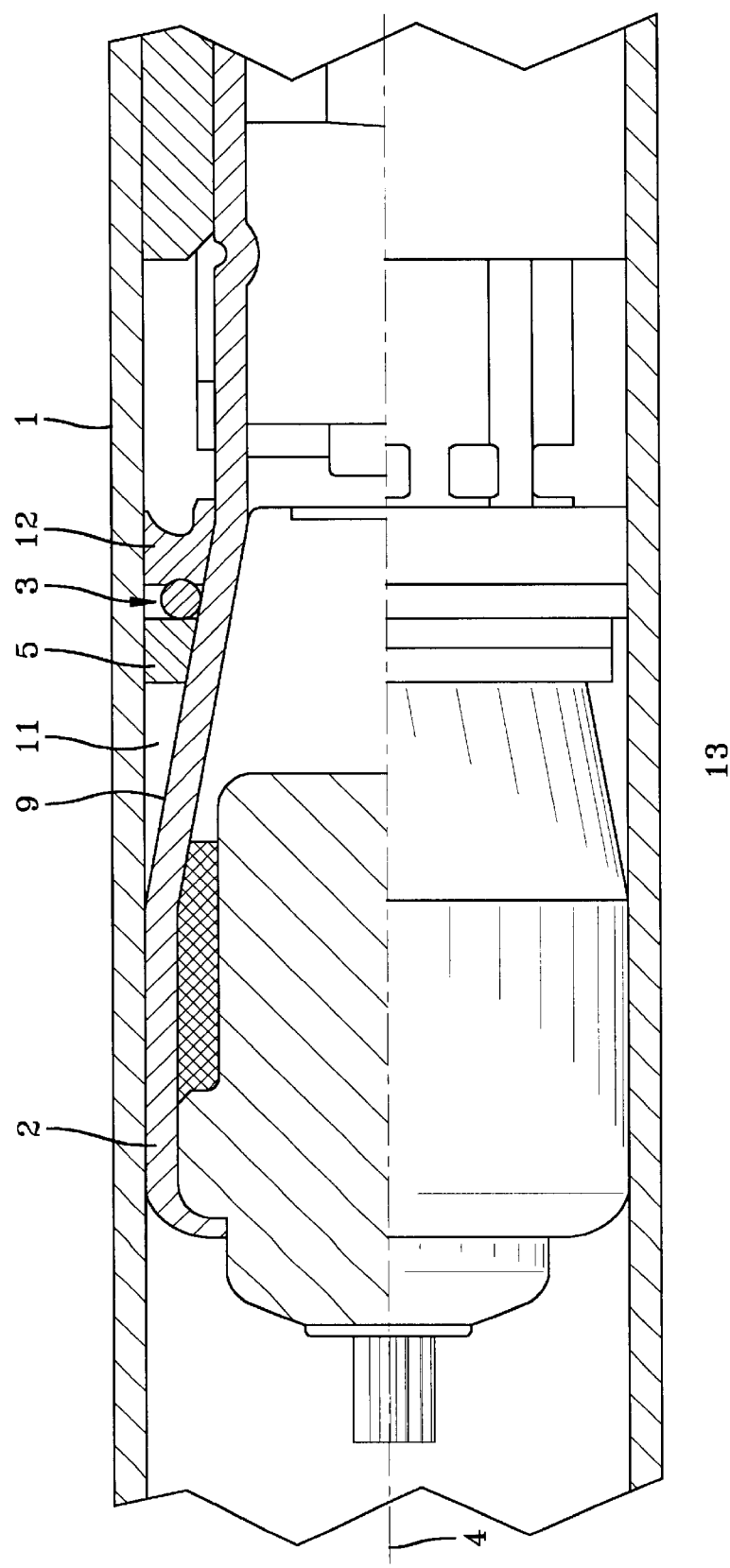
FIG. 1 shows an embodiment of the invention.
Figure 2:
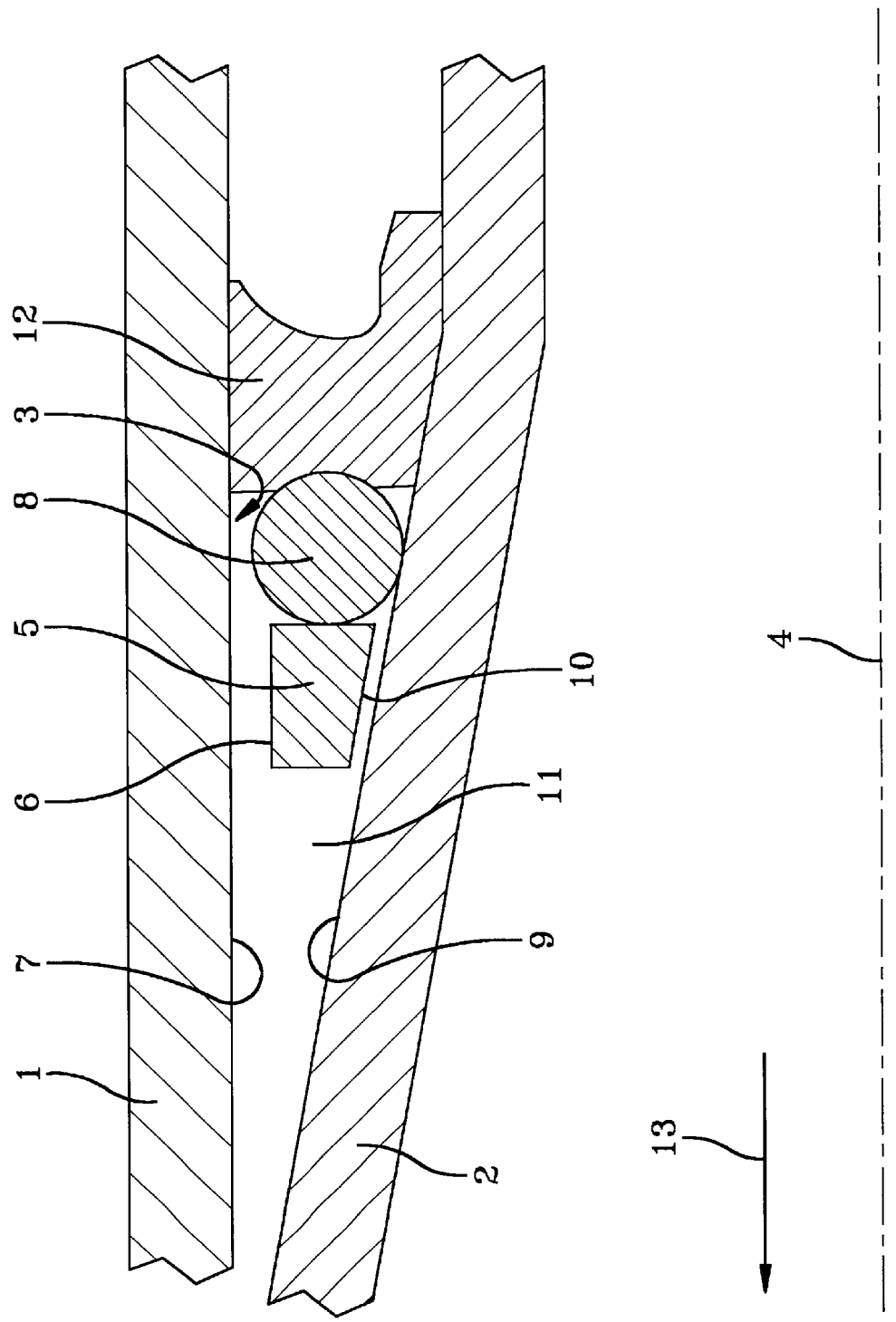
FIG. 2 shows a detailed representation of the embodiment of FIG. 1 in the region of the reverse movement lock.

The embodiment shown in the figures of a linear pretensioning drive for the tightening of a vehicle seat belt has a guide tube 1 and a piston 2 located inside of the guide tube that can be driven along the longitudinal axis 4 of the guide tube. The piston 2 can be driven by a pyrotechnic driving means. It is also possible, to drive the piston 2 in an electromagnetic or similar manner for the axial movement in the guide tube 1. The drive direction is represented in FIGS. 1 and 2 from right to left by an arrow 13. When driven, the piston 2 moves along the longitudinal axis 4 of the guide tube. The piston 2 is connected to a structural part of the seat belt via a not further represented connection means, for instance a traction cable. The connection can be made with one of the three anchoring points in a three-point seat belt.

To avoid an excessively long return stroke of the piston 2 following a drive movement of the piston 2 from right to left in FIGS. 1 and 2, a reverse movement lock 3 is associated with the piston 2. To this effect a tapered surface 9, which is arranged as a conical surface around the longitudinal axis 4 of the guide tube, is located at the posterior end of the piston with respect to the drive direction that is indicated by the arrow 13. The tapered surface 9 rises towards the guide tube from the posterior end of the piston to the anterior end of the piston; i.e. its diameter increases in this direction. In the represented embodiment, the reverse movement lock 3 has balls that are arranged around the tapered surface 9 in a ring around the longitudinal axis 4 of guide tube in an end region, i.e. in a region with a reduced diameter of the tapered surface 9. With the help of a holder 12, the reverse movement lock 3 comprising the balls 8 is secured. The reverse movement lock 3 can further comprise other locking elements that are relatively small supporting surfaces, e.g. of rolling bodies or clamping bodies. Due to the holder 12, which is ring-shaped, during normal operation and when the piston 2 is driven, the reverse movement lock 3 is held in the represented position, in which it is freely movable with respect to the inner wall of the guide tube 1.

In the represented embodiment at least one additional support part 5 is located in front of the reverse movement lock. Several support parts, which are designed as circular ring segments, can also be arranged around the longitudinal axis 4 of the guide tube in front of the reverse movement lock 3 in the region of the tapered surface 9. Each support part 5 comprises at its outer surface a supporting surface 6, which is greater than the supporting surface of the locking elements or balls 8 of the reverse movement lock at the outer side. The supporting surface 6 at each support part 5 in both the circumferential and axial direction is greater than the outer supporting surface of each locking element, in particular of each ball 8 of the reverse movement lock 3. The support part 5, or the support parts 5, are located in a conical ring space 11, which is formed between the tapered surface 9 and an inner wall 7 of the guide tube 1. In this way the force transmission onto the guide tube in the locking position takes place over an essentially greater surface than by means of the elements of the reverse movement lock alone. It is therefore possible to design the guide tube with a decreased wall strength. In addition, in the locking position an improved clamping effect is achieved. Trials have shown that this clamping effect can be improved by approximately 2.000 Newtons.

The supporting surface 6 on the outer side of each support part 5 is adapted to the inner surface 7 of the guide tube 1 and extends parallel to the inner wall 7 of the guide tube 1. The inner surface 10 on the support part 5 is adapted to the tapered surface 9 on the piston 2. The inner surface 10 on the support part 5 in particular is parallel to the tapered surface 9. During normal operation and when the piston 2 is driven in the drive direction, i.e. in the figures from right to left, that is indicated by the arrow 13, not only the balls 8 of the reverse movement lock 3, but also the support parts 5 are arranged to be freely movable with relation to the inner wall 7 of the guide tube 1. If at the end of a driving movement, the piston 2 has reached its very front end position and as a result of a forward displacement of the seat belt-wearing vehicle occupant, a force is exerted on the piston 2 opposite to the drive direction by means of a connection means, with which the piston 2 is connected to the seat belt, the piston 2 is moved along a short distance opposite to the drive direction, i.e. from right to left opposite to the direction of the arrow 13. The locking elements, in particular the balls 8 of the reverse movement lock 3 and the support part 5, or support parts 5, are then pushed into the narrowing conical ring space 11. The reverse movement lock 3 as well as the support part or parts 5 are then moved into a locking position, in which they are clamped or pushed in between the tapered surface 9 of the piston and the inner wall 7 of he guide tube. In this manner the piston 2 is prevented from a further return stroke opposite to the drive direction. In this locking position, the forces originating from the piston 2 are transferred in an extensive manner, in particular over the inner surface 10 of the support part or support parts 5 and the supporting surface 6 on the outer side of the support part or support parts 5, onto the guide tube 1, which in this operating state works as a brake tube. In this way a very good force transfer from the piston 2 to the guide tube 1 is achieved with a decreased loading of the guide tube 1. In addition, an improved clamping effect is achieved.

In the locking position, the support part, or the support parts, are supported with in each case their inner wall on the tapered surface on the piston and with their outer surface or supporting surface on the inner wall of the guide tube. The forces caused by the forward displacement of the seat belt-wearing vehicle occupant and transmitted via the pulling means onto the piston, are led into the guide tube, which exerts a braking effect in the locking position, via the support parts, which comprise in each case the supporting surfaces at the inner side and outer side. The load which is thus exerted on the guide tube is essentially decreased in comparison with the circular line-shaped load which is exerted on the tube by the balls of the reverse movement lock arranged in a ring.

The locking elements, in particular the balls 8 of the reverse movement lock 3, are harder or have a greater resistance to deformation than the guide tube 1. In addition, the top surface of the tapered surface 9 can also comprise a harder material than the guide tube 1. During the positioning of the reverse movement lock 3 and the support part 5 or support parts 5 in the locking position, firstly an indentation of the locking elements or the balls 8 of the reverse movement lock 3 into the material of the guide tube 1 takes place. The material of the guide tube 1 is thereby deformed to a determined degree with energy absorption. This deformation does not occur to the extent that it leads to the destruction of the guide tube 1, since subsequently the support part or support parts 5 is/are pushed with in each case the supporting surface 6 against the inner wall 7 of the guide tube 1.

It is understood that the invention is not limited to the particular construction and arrangement of parts herein illustrated and described, but embraces such modified forms thereof as come within the scope of the following claims.

What is claimed is:

1. A linear pretensioning drive for tightening a vehicle seat belt comprising:
   a guide tube;
   a piston that is located inside the guide tube and can be driven along a longitudinal axis of the guide tube in a drive direction; and
   a reverse movement lock comprising locking elements arranged on a ring around the longitudinal axis of the guide tube, the locking elements, on movement of the piston in an opposite direction to the drive direction, assume a locking position between the piston and the guide tube, which locks the further return stroke of the piston against the drive direction, in the drive direction in front of the reverse movement lock at least one support part is provided which, in the locking position, lies against an inner wall of the guide tube with a greater supporting surface than each locking element of the reverse movement lock, wherein the at least one support part and the reverse movement lock can be moved into the locking position along a tapered surface that is provided on the piston.

2. The linear pretensioning drive according to claim 1, wherein the support part comprise an inner surface adapted to the course of the tapered surface and on the outer side a supporting surface adapted to the inner wall of the guide tube.

3. The linear pretensioning drive according to claim 2, wherein the inner surface of each support part extends essentially parallel to the tapered surface on the piston and the supporting surface of each support part runs approximately parallel to the inner wall of the guide tube.

4. The linear pretensioning drive according to claim 1, wherein in the locking position the at least one support part is pushed into a conically tapering ring space, which is formed in the drive direction in front of the reverse movement lock between the tapered surface on the piston and the inner wall of the guide tube.

5. The linear pretensioning drive according to one claim 1, wherein the reverse movement lock is formed by several balls arranged on a ring around the longitudinal axis of the guide tube.

6. The linear pretensioning drive according to claim 5, wherein the locking elements or balls of the reverse movement lock are harder than the guide tube.

7. The linear pretensioning drive according to claim 5, wherein during the positioning of the reverse movement lock in the locking position, firstly the locking elements or the balls of the reverse movement lock are indented into the inner wall under deformation of the inner wall of the guide tube and subsequently the at least one support part is pushed with its supporting surface onto the inner wall of the guide tube.

* * * * *